(12) United States Patent
Duan

(10) Patent No.: US 11,508,144 B2
(45) Date of Patent: Nov. 22, 2022

(54) METHOD AND DEVICE FOR OBJECT DETECTION

(71) Applicant: BOE TECHNOLOGY GROUP CO., LTD., Beijing (CN)

(72) Inventor: Ran Duan, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 175 days.

(21) Appl. No.: 16/760,847

(22) PCT Filed: Sep. 17, 2019

(86) PCT No.: PCT/CN2019/106145
§ 371 (c)(1),
(2) Date: Apr. 30, 2020

(87) PCT Pub. No.: WO2020/082936
PCT Pub. Date: Apr. 30, 2020

(65) Prior Publication Data
US 2020/0356801 A1    Nov. 12, 2020

(30) Foreign Application Priority Data
Oct. 26, 2018   (CN) .......................... 201811260405.3

(51) Int. Cl.
*G06V 10/50* (2022.01)
*G06V 10/44* (2022.01)
(Continued)

(52) U.S. Cl.
CPC ............ *G06V 10/50* (2022.01); *G06V 10/446* (2022.01); *G06V 10/56* (2022.01); *G06V 10/955* (2022.01); *G06V 10/473* (2022.01)

(58) Field of Classification Search
None
See application file for complete search history.

(56) References Cited

U.S. PATENT DOCUMENTS

2014/0152821 A1   6/2014   Fu et al.
2017/0341583 A1*  11/2017  Zhang .................... H04N 7/181
(Continued)

FOREIGN PATENT DOCUMENTS

CN    103325258 A    9/2013
CN    105760858 A    7/2016
(Continued)

OTHER PUBLICATIONS

Chinese Office Action issued in corresponding Chinese Patent Application No. 201311260405.3, dated Jul. 28, 2021, with English translation.

*Primary Examiner* — Mohammed Rachedine
(74) *Attorney, Agent, or Firm* — McDermott Will & Emery LLP

(57) ABSTRACT

The present disclosure provides an object detection method and an object detection device. The object detection device includes: a heterogeneous processor and a memory, the heterogeneous processor including: a processing unit and a programmable logic unit, wherein the programmable logic unit is configured to receive a to-be-detected image, perform feature extraction on the to-be-detected image, and write an extracted feature into the memory; the processing unit is configured to read the feature from the memory, perform target object detection according to the feature, and output a detection result to the programmable logic unit; and the programmable logic unit is further configured to receive the detection result, generate prompt information according to the detection result, and output the prompt information.

17 Claims, 5 Drawing Sheets

(51) Int. Cl.
    *G06V 10/56*     (2022.01)
    *G06V 10/94*     (2022.01)
    *G06V 10/46*     (2022.01)
    *G06V 10/40*     (2022.01)
    *G06V 20/00*     (2022.01)

(56) References Cited

U.S. PATENT DOCUMENTS

2020/0402256 A1\* 12/2020 Kobayashi .............. G01S 17/42
2021/0256286 A1\* 8/2021 Takatsuka ............ H04N 5/3454

FOREIGN PATENT DOCUMENTS

| | | | | |
|---|---|---|---|---|
| CN | 105847766 A | | 8/2016 | |
| CN | 108038447 A | \* | 5/2018 | ......... G06K 9/00369 |
| CN | 108038447 A | | 5/2018 | |
| CN | 109344801 A | | 2/2019 | |
| CN | 109643363 A | \* | 4/2019 | .............. G06K 9/42 |
| KR | 20190104783 A | \* | 9/2019 | |
| WO | WO-2019229855 A1 | \* | 12/2019 | ......... G06K 9/00362 |

\* cited by examiner

METHOD AND DEVICE FOR OBJECT DETECTION

CROSS-REFERENCE TO RELATED APPLICATION(S)

This application is a Section 371 National Stage Application of International Application No. PCT/CN2019/106145, filed on Sep. 17, 2019 and entitled "METHOD AND DEVICE FOR OBJECT DETECTION", and claims priority to Chinese Application No. 201811260405.3, filed on Oct. 26, 2018, which are incorporated herein by reference in their entireties.

TECHNICAL FIELD

The present disclosure relates to the field of object detection, and in particular, to a method and a device for object detection.

BACKGROUND

In recent years, various methods have been proposed with respect to research in the field of object detection. Object detection has a wide range of applications in various fields, such as intelligent assisted driving, intelligent monitoring, pedestrian analysis, intelligent robots, etc.

Currently, object detection has entered a rapid development stage, but there are also many problems that need to be solved urgently, mainly consisting in that it cannot reach a good balance in performance and speed. Generally, the object detection algorithm is processed in the central processing unit (CPU) of the Von Neumann architecture. However, there are a large amount of feature calculations and image scaling in the object detection algorithm, and the computation amount is very huge. Very low calculation efficiency may occur when the CPU of the Von Neumann architecture is used for calculation, which directly leads to the problem of a slower computation speed.

SUMMARY

According to a first aspect of embodiments of the present disclosure, an object detection device is provided. The object detection device includes: a heterogeneous processor and a memory, the heterogeneous processor comprising: a processing unit and a programmable logic unit, wherein the programmable logic unit is configured to receive a to-be-detected image, perform feature extraction on the to-be-detected image, and write an extracted feature into the memory; the processing unit is configured to read the feature from the memory, perform target object detection according to the feature, and output a detection result to the programmable logic unit; and the programmable logic unit is further configured to receive the detection result, generate prompt information according to the detection result, and output the prompt information.

In an embodiment of the present disclosure, the processing unit is a processing unit of a CPU architecture.

In an embodiment of the present disclosure, the programmable logic unit is one of a Field Programmable Gate Array (FPGA) and a Complex Programmable Logic Device (CPLD).

In an embodiment of the present disclosure, the feature extraction comprises any one of: Histogram of Oriented Gradient (HOG); Scale-Invariant Feature Transform (SIFT); Speeded Up Robust Features (SURF); Difference of Gaussian (DOG); Local Binary Pattern (LBP); or haar-like feature extraction algorithm.

In an embodiment of the present disclosure, the programmable logic unit comprises: a color format conversion unit and a feature extraction unit, wherein the color format conversion unit is configured to receive the to-be-detected image, perform color format conversion on the to-be-detected image, and output a converted to-be-detected image to the feature extraction unit; and the feature extraction unit is configured to receive the converted to-be-detected image input by the color format conversion unit, perform Aggregation Channel Features (ACF) extraction on the converted to-be-detected image, and write extracted ACF into the memory.

In an embodiment of the present disclosure, the feature extraction unit comprises: a color space conversion unit, a down-sampling unit, at least one feature calculation unit, and a Direct Memory Access (DMA) and a scaling unit corresponding to each feature calculation unit, wherein the color space conversion unit is configured to perform color space conversion on the converted to-be-detected image to obtain color space information of the to-be-detected image, and output the color space information to the down-sampling unit; the down-sampling unit is configured to down-sample the color space information to generate a down-sampled image in at least one scale, and output the down-sampled image in each scale to the corresponding feature calculation unit; each of the at least one feature calculation unit is configured to calculate a corresponding scale feature for each pixel of the down-sampled image in a corresponding scale, and output the scale feature corresponding to the down-sampled image in the scale to the DMA unit corresponding to the feature calculation unit as a scale feature of the scale; the DMA unit is configured to write, into the memory, the scale feature corresponding to the down-sampled image in the scale input by the feature calculation unit; and the scaling unit is configured to read the scale feature of each scale from the memory, sequentially scale the scale feature of each scale according to a preset scaling rule to obtain a preset number of scale features, and writing the preset number of scale features into the memory as the ACF.

In an embodiment of the present disclosure, each of the feature calculation unit is configured to calculate gradient values in horizontal and vertical directions for each pixel of the down-sampled image in the scale; calculate a gradient magnitude and a direction angle according to the gradient values in horizontal and vertical directions; scale down the gradient magnitude in a preset proportion to generate a gradient magnitude feature; calculate a corresponding Histogram of Oriented Gradient (HOG) according to the gradient magnitude and the direction angle; and determine the color space information, the gradient magnitude feature and the HOG corresponding to each pixel of the down-sampled image in the scale as scale features corresponding to the down-sampled image in the scale.

In an embodiment of the present disclosure, the feature calculation unit scales down the gradient magnitude in the preset proportion to generate the gradient magnitude feature by operations of: dividing the gradient magnitude corresponding to the down-sampled image in the scale into 2×2 sub-blocks, then calculating an average value of the gradient magnitudes of each sub-block, and then taking the calculated average value of the gradient magnitudes as a gradient magnitude feature of the down-sampled image so as to obtain a gradient magnitude for which row and column resolutions are scaled down by half respectively compared to the down-sampled image in the scale, as the gradient magnitude feature of the scale.

In an embodiment of the present disclosure, the programmable logic unit comprises: a prompt output unit configured to receive the detection result from the processing unit, generate corresponding prompt information according to the detection result, and output the prompt information.

In an embodiment of the present disclosure, the prompt output unit generates the corresponding prompt information according to the detection result and outputs the prompt information by operations of: generating corresponding warning information according to the detection result, and outputting the warning information to an audio output device.

In an embodiment of the present disclosure, the prompt output unit generates the corresponding prompt information according to the detection result and outputs the prompt information by operations of: generating a corresponding prompt box according to coordinates and a size of a target object in the detection result, synthesizing the prompt box in the to-be-detected image, and outputting a synthesized image to a display device.

According to a second aspect of embodiments of the present disclosure, there is provided an object detection method applied to the object detection device as described previously. The object detection method includes: receiving, by the programmable logic unit, the to-be-detected image; performing, by the programmable logic unit, the feature extraction on the to-be-detected image, and writing the extracted feature into the memory, wherein the feature is used to instruct the processing unit to perform the target object detection and output the detection result to the programmable logic unit; and receiving, by the programmable logic unit, the detection result from the processing unit, generating the prompt information according to the detection result, and outputting the prompt information.

In an embodiment of the present disclosure, said performing by the programmable logic unit the feature extraction on the to-be-detected image comprises: receiving the to-be-detected image, and performing color format conversion on the to-be-detected image; and performing ACF extraction on the converted to-be-detected image.

In an embodiment of the present disclosure, said performing the ACF extraction on the converted to-be-detected image comprises: performing color space conversion on the converted to-be-detected image to obtain color space information of the to-be-detected image; down-sampling the color space information to generate a down-sampled image in at least one scale; for each scale, calculating a corresponding scale feature for each pixel of the down-sampled image in the scale and writing the scale feature corresponding to the down-sampled image in the scale into the memory as a scale feature of the scale; and reading the scale feature of each scale from the memory; sequentially scaling the scale feature of each scale according to a preset scaling rule to obtain a preset number of scale features; and writing the preset number of scale features into the memory as the ACF.

In an embodiment of the present disclosure, said calculating the corresponding scale feature for each pixel of the down-sampled image in the scale comprises: calculating gradient values in horizontal and vertical directions for each pixel of the down-sampled image in the scale; calculating a gradient magnitude and a direction angle according to the gradient values in horizontal and vertical directions; scaling down the gradient magnitude in a preset proportion to generate a gradient magnitude feature; calculating a corresponding HOG according to the gradient magnitude and the direction angle; and determining the color space information, the gradient magnitude feature and the HOG corresponding to each pixel of the down-sampled image in the scale as scale features corresponding to the down-sampled image in the scale.

In an embodiment of the present disclosure, said generating the prompt information according to the detection result and outputting the prompt information comprises: generating corresponding warning information according to the detection result, and outputting the warning information to an audio output device; or generating a corresponding prompt box according to coordinates and a size of a target object in the detection result, synthesizing the prompt box in the to-be-detected image, and outputting a synthesized image to a display device.

According to a second aspect of embodiments of the present disclosure, there is provided an object detection method applied to the object detection device as described previously. The object detection method includes: reading the feature by the processing unit from the memory, the feature being extracted by the programmable logic unit from the to-be-detected image; performing the target object detection by the processing unit according to the feature, and outputting the detection result to the programmable logic unit, the detection result being used to instruct the programmable logic unit to generate and output the prompt information.

According to a second aspect of embodiments of the present disclosure, an electronic device is provided, comprising: the object detection device as described previously and an image capture device, wherein the image capture device is configured to capture the to-be-detected image, and output the captured to-be-detected image to the programmable logic unit.

In an embodiment of the present disclosure, the electronic device further comprises: an output device for receiving the prompt information input by the programmable logic unit and outputting the prompt information.

The above description is only an overview of the technical solutions of the present disclosure. In order to understand the technical means of the present disclosure more clearly, it may be implemented in accordance with the content of the description. And in order to make the above and other objects, features, and advantages of the present disclosure more obvious and understandable, particular implementations of the present disclosure are illustrated below.

BRIEF DESCRIPTION OF THE DRAWINGS

Various other advantages and benefits will become apparent to those skilled in the art upon reading the detailed description of the preferred embodiments below. The drawings are only for the purpose of illustrating preferred embodiments but are not to be considered as limiting the present disclosure. Moreover, the same reference numerals are used throughout the drawings to refer to the same parts. In the drawings.

DETAILED DESCRIPTION

Figure 1:
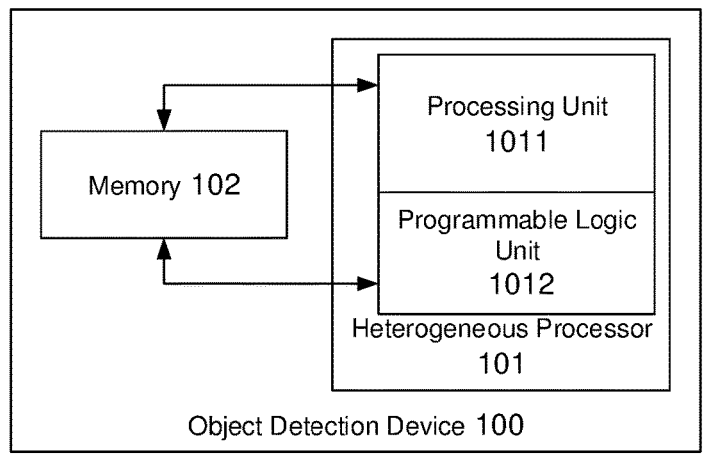
FIG. 1 is a schematic structural diagram of an object detection device according to an embodiment of the present disclosure.

Hereinafter, exemplary embodiments of the present disclosure will be described in more detail with reference to the accompanying drawings. Although the exemplary embodiments of the present disclosure are shown in the drawings, it should be understood that the present disclosure may be implemented in various forms but should not be limited by the embodiments set forth herein. On the contrary, these embodiments are provided to enable a thorough understanding of the present disclosure, and to fully convey the scope of the present disclosure to those skilled in the art.

An embodiment of the present disclosure provides an object detection device. The object detection device may be applied to fields such as intelligent assisted driving, intelligent monitoring, pedestrian analysis, and intelligent robots etc. Of course, it may also be applied to other computer vision application fields. The present disclosure does not make specific limitations thereon. The object detection device may be installed in an electronic device, such as a vehicle terminal, Advanced Driver Assistance Systems (ADAS), an autonomous vehicle, a security monitoring system, an intelligent transportation system, and the like.

FIG. 1 is a schematic structural diagram of an object detection device according to an embodiment of the present disclosure. Referring to FIG. 1, the object detection device 100 includes: a heterogeneous processor 101 and a memory 102. The heterogeneous processor 101 includes: a processing unit 1011 and a programmable logic unit 1012.

In an embodiment of the present disclosure, the foregoing heterogeneous processor is mainly composed of two major parts, which are a processing unit, i.e., a Processing System (PS) part, and a programmable logic unit, i.e., a Programmable Logic (PL) part. Data may be exchanged between the processing unit and the programmable logic unit through a bus.

In practical applications, the PS part may be a processing unit based on a Central Processing Unit (CPU) architecture, such as a System on Chip (SOC) part of a Reduced Instruction Set Computing (RISC) processing unit (e.g., Advanced RISC Machine (ARM)). The PL part may be a Field Programmable Gate Array (FPGA) part and a Complex Programmable Logic Device (CPLD) part. The bus may be an on-chip bus, such as an Advanced eXtensible Interface (AXI) bus, an Advanced High Performance Bus (AHB), etc. The memory may be DDR, such as DDR2, DDR3, etc. The embodiments of the present disclosure do not make specific limitation thereon.

With reference to the above object detection device, in the embodiment of the present disclosure, a programmable logic unit is configured to receive a to-be-detected image; perform feature extraction on the to-be-detected image, and write an extracted feature into a memory. A processing unit is configured to read the feature from the memory, perform target object detection according to the feature, and output a detection result to the programmable logic unit. The programmable logic unit is further configured to receive the detection result, generate prompt information according to the detection result, and output the prompt information.

In practical applications, the above object detection device may be connected to an image capture device. The image capture device may be an on-vehicle camera, a surveillance camera, etc. The image capture device may capture images or video streams in a capture area in real time. The captured image or video stream is the to-be-detected image that is to be processed by the object detection device. After the image capture device captures the to-be-detected image, it outputs the to-be-detected image to the object detection device for processing.

It should be noted that the image feature extraction method may include, for example: Histogram of Oriented Gradient (HOG); Scale-Invariant Feature Transform (SIFT); Speeded Up Robust Features (SURF); Difference of Gaussian (DOG); Local Binary Pattern (LBP); haar-like feature extraction algorithm, etc.

Aggregated Channel Features (ACF) and Integral Channel Features (ICF) are variants of the HOG feature extraction method.

In an embodiment of the present disclosure, the programmable logic unit may perform ACF extraction on the to-be-detected image. Accordingly, the processing unit may perform ACF-based object detection. Of course, the programmable logic unit may also perform ICF extraction on the to-be-detected image. Accordingly, the processing unit may perform ICF-based object detection. In practical applications, the programmable logic unit may also extract different features of the to-be-detected image according to different object detection algorithms. Accordingly, the processing unit performs object detection based on different features extracted by the programmable logic unit, which is not specifically limited in the embodiments of the present disclosure.

In an embodiment of the present disclosure, the above object detection device is described in detail below by taking an ACF-based object detection algorithm as an example.

First, the programmable logic unit is introduced.

Figure 2:
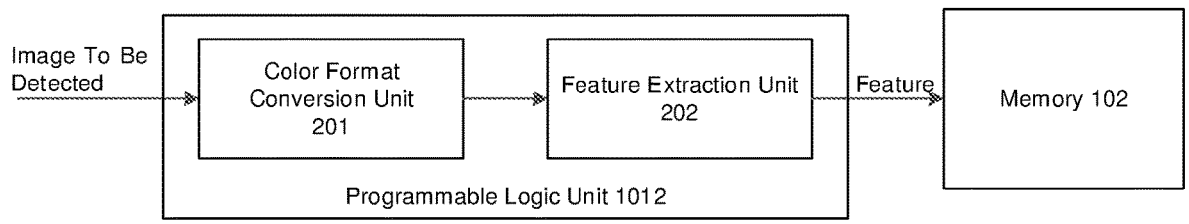
FIG. 2 is a schematic structural diagram of a programmable logic unit according to an embodiment of the present disclosure.

FIG. 2 is a schematic structural diagram of the programmable logic unit in an embodiment of the present disclosure. Referring to FIG. 2, the programmable logic unit 1012 may include: a color format conversion unit 201 and a feature extraction unit 202. The color format conversion unit 201 is configured to receive the to-be-detected image, perform color format conversion on the to-be-detected image, and output the converted to-be-detected image to the feature extraction unit 202. The feature extraction unit 202 is configured to receive the converted to-be-detected image input by the color format conversion unit 201, perform ACF extraction on the converted to-be-detected image, and write extracted ACF into the memory 102.

Specifically, after receiving the to-be-detected image, the color format conversion unit 201 first performs color format conversion on the to-be-detected image. For example, after the information captured by the image capture device is converted to the RGB format, the converted to-be-detected image is output to the feature extraction unit 202. Then, the feature extraction unit 202 performs ACF extraction on the converted to-be-detected image. After extracting the ACF, the feature extraction unit 202 may write the ACF into the memory via the bus.

In an embodiment of the present disclosure, a memory control unit corresponding to a memory is provided at the PS side, i.e., in the processing unit. Therefore, when the feature extraction unit 202 writes the extracted ACF into the memory, the ACF need to be input to the memory control unit in the processing unit via the bus first, and are then written into the memory by the memory control unit. Of course, if the programmable logic unit may directly access the memory, the feature extraction unit 202 may also directly write the extracted ACF into the memory, which is not specifically limited in the embodiments of the present disclosure.

In actual applications, the so-called ACF are to superimpose several different channel features together to form unified features. Commonly used feature channels are color channels (such as RGB color channels, LUV color channels, gray channels, etc.), gradient channels (including gradient magnitude channels and gradient direction channels), and edge channels (such as Sobel edge channels, Canny edge channels, etc.), and the like. The feature extraction unit 202 performs channel feature extraction on the to-be-detected image to extract the ACF.

Figure 3:
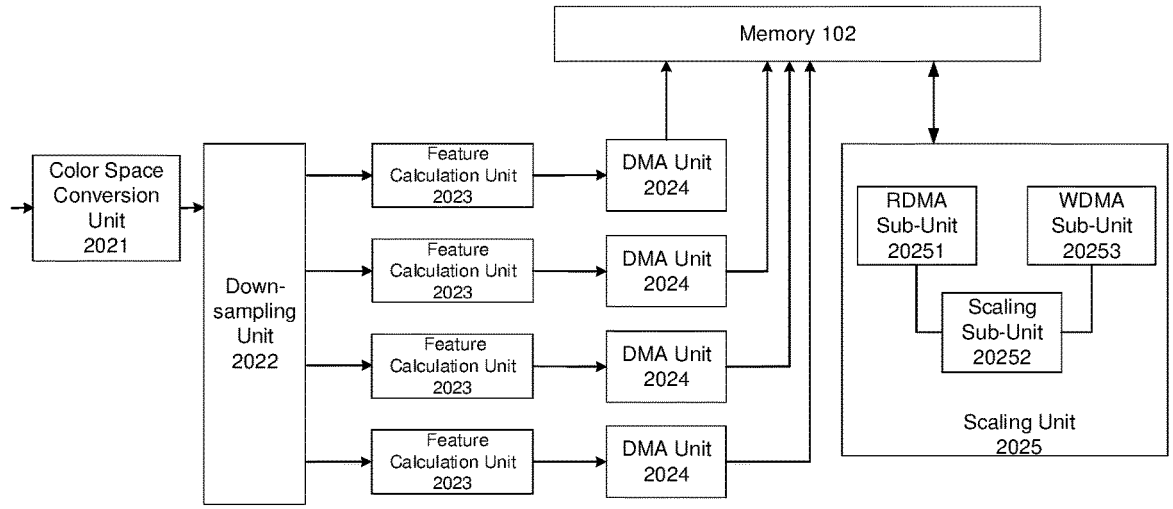
FIG. 3 is a schematic structural diagram of a feature extraction unit according to an embodiment of the present disclosure.

Specifically, FIG. 3 is a schematic structural diagram of the feature extraction unit 202 in an embodiment of the present disclosure. Referring to FIG. 3, the feature extraction unit 202 includes a color space conversion unit 2021, a down-sampling unit 2022, at least one feature calculation unit 2023, and a Direct Memory Access (DMA) unit 2024 and a scaling unit 2025 corresponding to each feature calculation unit 2023. The color space conversion unit 2021 is configured to perform color space conversion on the converted to-be-detected image to obtain color space information of the to-be-detected image; and output the color space information to the down-sampling unit 2022. The down-sampling unit 2022 is configured to down-sample the color space information to generate a down-sampled image in at least one scale, and output the down-sampled image in each scale to the corresponding feature calculation unit 2023. Each of the at least one feature calculation unit 2023 is configured to calculate a corresponding scale feature for each pixel of the down-sampled image in a corresponding scale, and output the scale feature corresponding to the down-sampled image in the scale to the DMA unit 2024 corresponding to the feature calculation unit as a scale feature of the scale. The DMA unit 2024 is configured to write, into the memory 102, the scale feature corresponding to the down-sampled image in the scale input by the feature calculation unit. The scaling unit 2025 is configured to read the scale feature of each scale from the memory, sequentially scale the scale feature of each scale according to a preset scaling rule to obtain a preset number of scale features, and write the preset number of scale features into the memory 102 as the ACF.

According to an embodiment of the present disclosure, the down-sampling unit 2022 is configured to perform down-sampling processing on the color space information, so as to reduce the calculation amount of subsequent feature calculations, thereby achieving a faster speed and lower power consumption, meanwhile the accuracy will not be reduce too much.

According to an embodiment of the present disclosure, the scaling unit 2025 may include an RDMA sub-unit 20251, a scaling sub-unit 20252, and a WDRM sub-unit 20253. The RDMA sub-unit 20251 is configured to read the scale feature of each scale from the memory. The scaling sub-unit 20252 is configured to scale the scale feature of each scale sequentially according to a preset scaling rule to obtain a preset number of scale features. The WDRM sub-unit 20253 is configured to write the preset number of scale features into the memory 102 as the ACF.

In an embodiment of the present disclosure, after the down-sampling processing is performed on the color space information, down-sampled images in a plurality of scales (resolutions) are generated, wherein the down-sampled image in each scale is input to the corresponding feature calculation unit. After the feature calculation unit performs feature calculation on the corresponding down-sampled image, the scale feature of each scale is input to the corresponding DMA unit. At this time, the DMA unit may be a DMA unit that performs a write operation, i.e., a WDMA unit. The WDMA unit writes the scale feature input to itself into the memory via the bus, so that the scale feature of each scale is written into the memory. Next, the DMA unit in the scaling unit 2025 that performs a read operation, i.e., an RDMA sub-unit 20251, reads the scale feature of each scale sequentially via the bus, and inputs the scale feature into the scaling sub-unit 20252 in the scaling unit. The scaling sub-unit 20252 scales the scale feature of each scale according to the preset scaling rule to obtain the preset number of scale features, and input them, as the ACF of the to-be-detected image, to the DMA unit in the scaling unit that performs the write operation, i.e., the WDMA sub-unit 20253. Then, the WDMA sub-unit 20253 writes the ACF of the to-be-detected image into the memory 102 via the bus. At this point, the ACF extraction process on the to-be-detected image is completed.

It should be noted that the above preset scaling rule is to perform a preset number of times of scaling on a basis of each down-sampled image to obtain a preset number of scale features. That is, images in N different scales are obtained by down-sampling the to-be-detected image. Then, for each down-sampled image in each scale, the scale feature of the down-sampled image is extracted. As such, the corresponding scale features in N scales may be obtained. Next, according to the preset scaling rule, and taking each of the N scales as a reference scale, the scale feature of each of the N scales is scaled down and/or up M times, so as to obtain S=M*N scale features. Here, the resolution of the scale feature of the each scale that is extracted for the down-sampled image in the scale is smaller than that of the down-sampled image in the scale. On the premise of guaranteeing that the feature direction is effectively determined, the computation complexity is simplified to a certain degree so as to save hardware resources. In practical applications, the number of times of performing the scaling may be set according to the needs of the actual computation performance.

Further, the above feature calculation unit is specifically configured to calculate gradient values in horizontal and vertical directions for each pixel of the down-sampled image in one scale; calculate a gradient magnitude and a direction angle according to the gradient values in horizontal and vertical directions; scale down the gradient magnitude in a preset proportion to generate a gradient magnitude feature; calculate a corresponding HOG according to the gradient magnitude and the direction angle; and determine the color space information, the gradient magnitude feature and the HOG corresponding to each pixel of the down-sampled image in the scale as scale features corresponding to the down-sampled image in the scale.

Further, the above feature calculation unit may scale down the gradient magnitude in the preset proportion to generate the gradient magnitude feature by operations of: dividing the gradient magnitude corresponding to the down-sampled image in the scale into 2×2 sub-blocks, then calculating an average value of the gradient magnitudes of each sub-block, and then taking the calculated average value of the gradient magnitudes as a gradient magnitude feature of the down-sampled image so as to obtain a gradient magnitude for which row and column resolutions are scaled down by half respectively compared to the down-sampled image in the scale, as the gradient magnitude feature of the scale.

Figure 4:
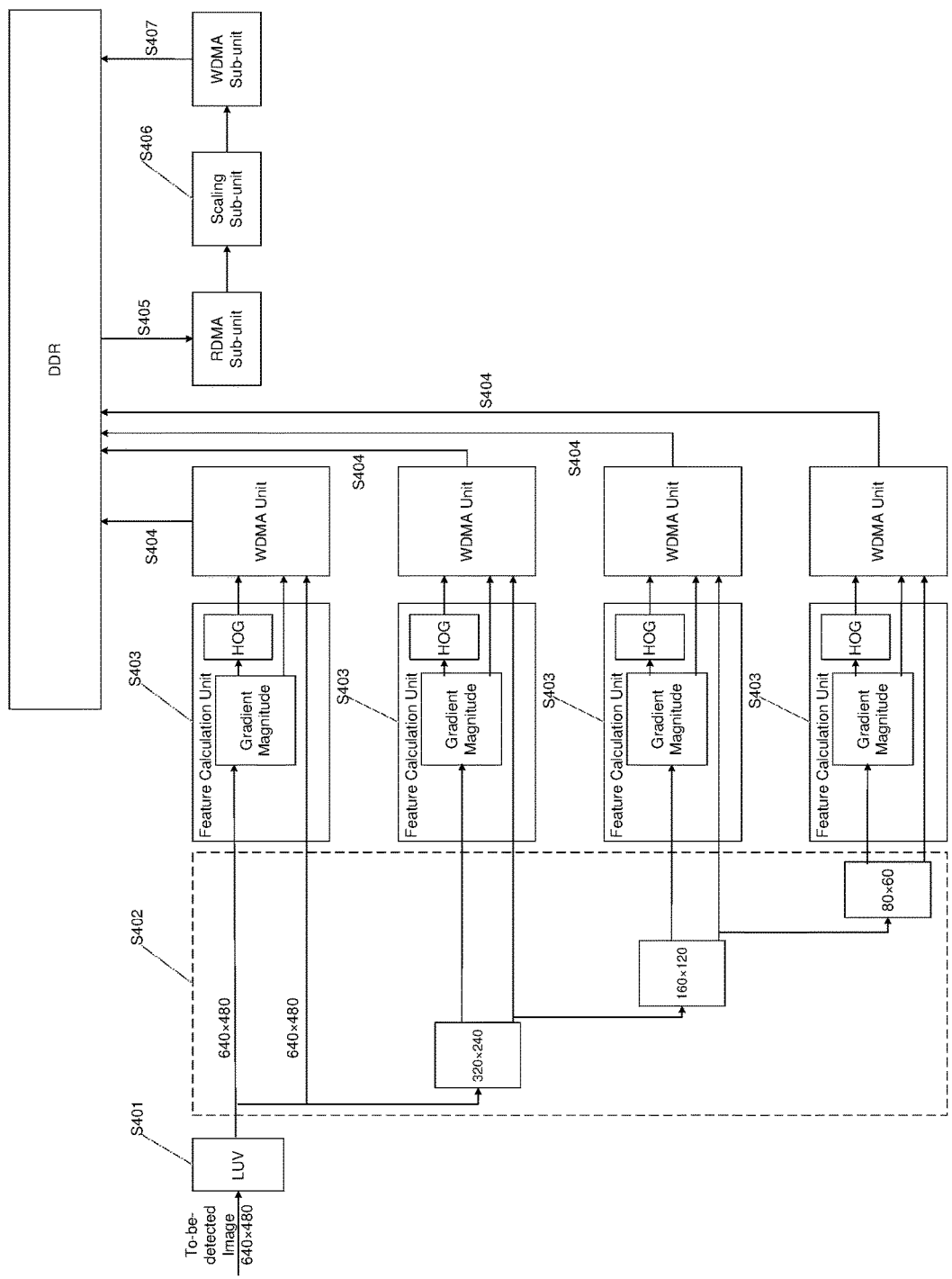
FIG. 4 is a schematic diagram of a process of performing ACF extraction on a to-be-detected image according to an embodiment of the present disclosure.

For example, an RGB 3 channel 640×480 input image being the to-be-detected image is taken as an example. FIG. 4 is a schematic diagram of a process of performing ACF extraction on the to-be-detected image in an embodiment of the present disclosure. Referring to FIG. 4, the ACF extraction process includes following steps.

In Step S401, the color space conversion unit performs a color space conversion from RGB to LUV on each pixel in the to-be-detected image to obtain a 3-channel LUV feature.

In practical applications, the color space conversion unit may also perform 1:2 resolution downscale on the 3-channel LUV feature to obtain a new 3-channel LUV feature.

In practical applications, the color space conversion unit may also perform other color space conversion, such as from RGB to HIS or from RGB to HSV, which is not specifically limited in the embodiments of the present disclosure.

In Step S402, the down-sampling unit marks the converted LUV image as Scale S0, which corresponds to an image having a resolution of 640×480; scales down by half on the basis of Scale S0 to obtain Scale S8, which corresponds to an image having a resolution of 320×240; scales down by half on the basis of Scale S8 to obtain Scale S16, which corresponds to an image having a resolution of 160×120; and scales down by half on the basis of Scale S16 to obtain Scale S24, which corresponds to an image having a resolution of 80×60.

In this way, the down-sampling unit obtains down-sampled images in a total of four scales, i.e., in Scale S0, Scale S8, Scale S16, and Scale S24.

In Step S403, for each of the above down-sampled images in the 4 scales, the feature calculation unit calculates the gradient magnitude and the HOG feature. Calculations of the gradient magnitudes and the HOG features are performed on the above down-sampled images in the 4 scales in a pipelined manner.

In Step One, the horizontal gradient Gx and the vertical gradient Gy are calculated.

In the first case, for the l component of the down-sampled image (the L component in the LUV, i.e., the luminance component), the horizontal gradient Gx and the vertical gradient Gy are calculated according to Formula (1):

$$G_x[x,y]=(l[x+1,y]-l[x-1,y])/2$$

$$G_y[x,y]=(l[x,y+1]-l[x,y-1])/2, \quad (1)$$

wherein x represents the pixel points in the x-th row, y represents the pixel points in the y-th column, and l[x,y] represents the value of the l component of the y-th pixel point in the x-th row.

In the second case, for the edge pixel points, the horizontal gradient Gx and the vertical gradient Gy are calculated according to Formula (2):

$$G_x[0,y]=l[1,y]-l[0,y]$$

$$G_x[w-1,y]=l[w-1,y]-l[w-2,y]$$

$$G_y[x,0]=l[x,1]-l[x,0]$$

$$G_y[x,h-1]=l[x,h-1]-l[x,h-2], \quad (2)$$

wherein x represents the pixel points in the x-th row, y represents the pixel points in the y-th column, w represents the number of pixels in a row, h represents the number of pixels in a column, and l[x,y] represents the value of the l component of the pixel point in the y-th column of the x-th row.

In Step Two, the gradient magnitude M and the direction angle O are calculated:

$$M[x, y] = \sqrt{G_x[x, y]^2 + G_y[x, y]^2}$$

$$O[x, y] = \arccos\left(\frac{G_x[x, y]}{M[x, y]}\right) \quad (3)$$

In Step Three, the gradient magnitude feature of the L channel (i.e., the luminance channel) is generated.

Specifically, the calculated gradient magnitude may be directly used as the gradient magnitude feature. Alternatively, 1:2 resolution downscale may be performed on the gradient magnitude M [x, y], so as to obtain the L-channel gradient magnitude feature. Here, the 1:2 resolution downscale as described above refers to dividing the gradient magnitude into 2×2 sub-blocks, then calculating an average value of the gradient magnitudes of each sub-block, and then taking the calculated average value of the gradient magnitudes as a new gradient magnitude feature of the down-sampled image, so as to obtain a gradient magnitude for which row and column resolutions are scaled down by half respectively compared to the down-sampled image in the scale, as the gradient magnitude feature of the L channel corresponding to the down-sampled image.

In Step Four, an HOG feature is generated.

Specifically, a histogram of oriented gradient of 2×2 sub-blocks is calculated. The gradient direction angle O [x, y] ranges from 0 to π, which is divided into multiple intervals, for example, 6 intervals. For each of the 6 intervals, the number of direction angles within the interval is counted, so as to obtain the HOG feature of 6 channels.

Here, the 6 intervals are an empirical value. The 6 intervals are sufficient to determine the edge direction of the object, which may be used to determine the shape of the object in combination with the features of the U and V channels.

In this way, for the down-sampled image in each scale, the LUV features for characterizing grayscale, lightness and color information, the gradient magnitude feature for characterizing the contour of the object, and the HOG features of 6 channels for characterizing the direction, i.e., a total of features of 10 channels, are extracted. Here, the LUV features, the gradient magnitude feature, and the HOG features corresponding to the down-sampled image in each scale are determined as the scale features corresponding to the down-sampled image in that scale, and then, the scale features in Scale S0, Scale S8, Scale S16, and Scale S24 are obtained for the down-sampled images in Scale S0, Scale S8, Scale S16, and Scale S24 as described above.

In Step S404, the WDMA writes the scale features calculated by the corresponding feature calculation unit into the DDR.

In Step S405, The RDMA sub-unit in the scaling unit reads the scale features in Scale S0, Scale S8, Scale S16, and Scale S24 sequentially from the DDR.

In Step S406, the scaling sub-unit in the scaling unit uses Scale S0, Scale S8, Scale S16, and Scale S24 as the reference scales, and scales the scale features of those reference scales according to the scaling rules as shown in Table 1 below to obtain scale features in 29 scales.

Specifically, Table 1 lists image resolutions and feature resolutions of the scale features in respective scales in the embodiments of the present disclosure. As can be seen from Table 1 below, the scale features in Scales S1, S2, S3 and S4 may be obtained by scaling the scale features of Scale S0; the scale features in Scales S5, S6, S7, S9, S10, S11 and S12 may be obtained by scaling the scale features of Scale S8; the scale features in Scales S13, S14, S15, S17, S18, S19 and S20 may be obtained by scaling the scale features of Scale S16; and the scale features in Scales S21, S22, S23, S25, S26, S27, and S28 may be obtained by scaling the scale features of Scale S24.

TABLE 1

| Scale | Image Resolution | Feature Resolution | Reference Scale |
|---|---|---|---|
| S0 | 640 × 480 | 320 × 240 | — |
| S1 | 586 × 440 | 293 × 220 | S0 |
| S2 | 538 × 404 | 269 × 202 | S0 |
| S3 | 494 × 370 | 247 × 185 | S0 |
| S4 | 454 × 340 | 227 × 170 | S0 |
| S5 | 416 × 312 | 208 × 156 | S8 |
| S6 | 382 × 286 | 191 × 143 | S8 |
| S7 | 350 × 262 | 175 × 131 | S8 |
| S8 | 320 × 240 | 160 × 120 | — |
| S9 | 294 × 220 | 147 × 110 | S8 |
| S10 | 306 × 202 | 153 × 101 | S8 |
| S11 | 248 × 186 | 124 × 93 | S8 |
| S12 | 226 × 170 | 113 × 85 | S8 |
| S13 | 208 × 156 | 104 × 78 | S16 |
| S14 | 190 × 142 | 95 × 71 | S16 |
| S15 | 174 × 130 | 87 × 65 | S16 |
| S16 | 160 × 120 | 80 × 60 | — |
| S17 | 146 × 110 | 73 × 55 | S16 |
| S18 | 134 × 100 | 67 × 50 | S16 |
| S19 | 122 × 92 | 61 × 46 | S16 |
| S20 | 112 × 84 | 56 × 42 | S16 |
| S21 | 104 × 78 | 52 × 39 | S24 |
| S22 | 96 × 72 | 48 × 36 | S24 |
| S23 | 88 × 66 | 44 × 33 | S24 |
| S24 | 80 × 60 | 40 × 30 | — |
| S25 | — | 37 × 28 | S24 |
| S26 | — | 33 × 25 | S24 |
| S27 | — | 31 × 23 | S24 |
| S28 | — | 28 × 21 | S24 |

Here, "—" in Table 1 means null.

It should be noted that, in the embodiments of the present disclosure, the finally obtained scale features in 29 scales are an empirical value, which is a balance among a plurality of test experiences according to the algorithm complexity and the discrimination accuracy of the object detection results. In practical applications, the scaling may be performed at more times on the scale features in the reference scales to increase the number of scales obtained, thereby further improving the accuracy on the size or distance of the object detected by the processing unit.

Here, since the programmable logic unit may perform processing using a high-speed clock, the calculation process for each scale, such as S406, is processed serially, which may completely achieve real-time processing in terms of the speed for a resolution of 640×480 and a data input bandwidth of 60 Hz.

In Step S407, the WDMA sub-unit in the scaling unit writes the scale features in 29 scales into the DDR sequentially.

Here, the above scale features in 29 scales are the ACF of the to-be-detected image. In addition, after the RDMA sub-unit reads the scale features in one scale from the DDR in S405, the scaling sub-unit scales the scale features in the scale, and then the WDMA sub-unit writes them into the DDR. Such a process is repeated 29 times, so as to complete the calculation for all the results.

As known from the above, the feature extraction process of the programmable logic unit, i.e., the PL part in the heterogeneous processor, is thus completed.

Figure 5:
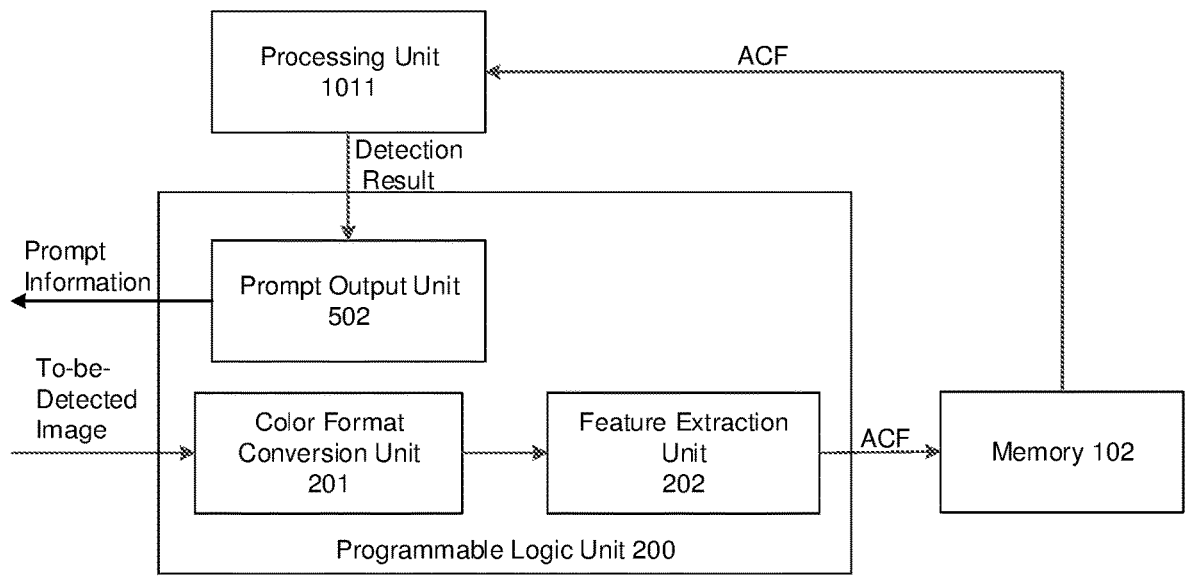
FIG. 5 is another schematic structural diagram of a programmable logic unit according to an embodiment of the present disclosure.

In an embodiment of the present disclosure, FIG. 5 is another schematic structural diagram of the programmable logic unit in the embodiment of the present disclosure. Referring to FIG. 5, the programmable logic unit 1012 may further include a prompt output unit 502 configured to receive the detection result from the processing unit 1011, generate corresponding prompt information according to the detection result, and output the prompt information.

Specifically, after the programmable logic unit writes the extracted ACF of the to-be-detected image into the memory, the processing unit may read those ACF from the memory, perform the target object detection based on the ACF, and feed the detection result back to the programmable logic unit. At this time, the above prompt output unit receives the detection result, generates the corresponding prompt information according to the detection result, and then outputs the prompt information.

In practical applications, the output prompt information may be, but not limited to, the following cases. Accordingly, the ways of outputting the prompt information are also different.

In the first case, the output prompt information may be warning information, such as a simple prompt sound or a prompt voice. Accordingly, the above prompt output unit may specifically generate the corresponding warning information according to the detection result, and output it to the audio output device for prompting the user. For example, when the detection result indicates that there is a pedestrian in the to-be-detected image, the prompt output unit may generate a rapid "ping" sound accordingly, and play through the audio output device, such as a car stereo, to prompt the user that there is a pedestrian. Of course, the prompt output unit may also generate a prompt voice such as "Watch out! There is a pedestrian." according to the detection result, and play it through the car stereo to prompt the user that there is a pedestrian.

Of course, the above prompt information may also have other forms, as long as it is audio information. Accordingly, the above audio output device may also be different with different electronic devices to which the object detection device is applied, which is not specifically limited in the embodiments of the present disclosure.

Figure 6:
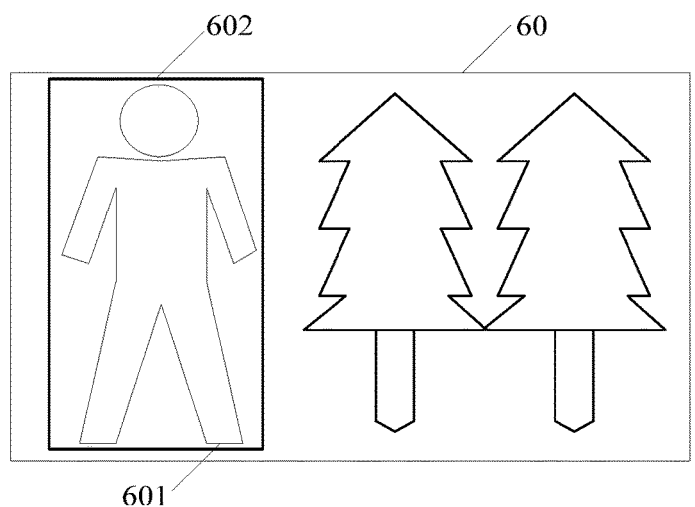
FIG. 6 is a schematic diagram of a synthesized image according to an embodiment of the present disclosure.

In the second case, the output prompt information may also be a prompt box corresponding to the target object. Accordingly, the above prompt output unit may specifically generate a corresponding prompt box according to coordinates and the size of the target object in the detection result, synthesize the prompt box in the to-be-detected image, and output the synthesized image to the display device for prompting the user. For example, FIG. 6 is a schematic diagram of a synthesized image in an embodiment of the present disclosure. Referring to FIG. 6, when the detection result indicates that there is a pedestrian 601 in the to-be-detected image 60, the prompt output unit may obtain the target object from the detection result, i.e., the coordinates and the size of the pedestrian 601 in the to-be-detected image 60, from which the corresponding prompt box 602 is generated. Then, the to-be-detected image 60 is synthesized with the prompt box 602, so that the prompt box 602 frames the pedestrian 601 out in the to-be-detected image 60. Then, the prompt output unit outputs the synthesized image to the on-board display screen to prompt the user of the pedestrian and the position of the pedestrian.

Of course, the prompt information and the way of outputting the prompt information may also be other cases that may prompt the user of the target object.

The prompt output unit is configured in the programmable logic unit, to fully utilize the real-time processing capability of the programmable logic unit, and may provide the prompt information more quickly.

Of course, according to the embodiments of the present disclosure, the prompt output unit may also be configured in the processing unit, so that the processing unit does not need to output the detection result to the programmable logic unit after detecting the target object, but may generate the corresponding prompt information based on the detection result, and output the prompt information.

In addition, it should be noted that in one or more of the above embodiments, the heterogeneous processor and the memory belong to first-level units; the processing unit and the programmable logic unit belong to second-level units; the color format conversion unit, the feature extraction unit, and the prompt output unit belong to third-level units; the color space conversion unit, the down-sampling unit, the at least one feature calculation unit, the DMA unit and the scaling unit corresponding to each feature calculation unit belong to fourth-level units; and the RDMA sub-unit in the scaling unit, the scaling sub-unit, and the WDMA sub-unit in the scaling unit belong to fifth-level units. Here, the second-level units are the units below the first-level units, the third-level units are the units below the second-level units, the fourth-level units are the units below the third-level units, and the fifth-level units are the units below the fourth-level units.

Next, the processing unit is introduced.

Figure 7:
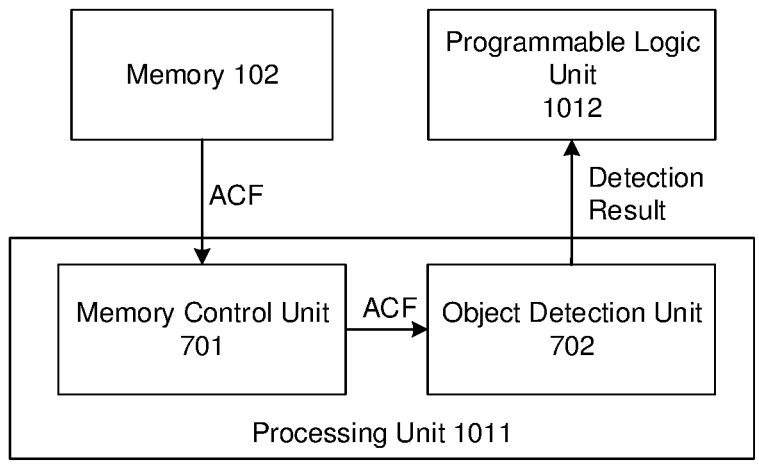
FIG. 7 is a schematic structural diagram of a processing unit according to an embodiment of the present disclosure.

FIG. 7 is a schematic structural diagram of the processing unit in an embodiment of the present disclosure. Referring to FIG. 7, the processing unit 1011 may include: a memory control unit 701 and an object detection unit 702, wherein the memory control unit 701 is a controller of the memory 102, and is configured to read the ACF from the memory 102. Here, the ACF are extracted from the to-be-detected image by the programmable logic unit 1012, i.e., the PL part, in the one or more embodiments as described above; the object detection unit 702 is configured to detect the target object according to the ACF, and output the detection result to the programmable logic unit 1012. The detection result is used by the programmable logic unit 1012 to generate and output the prompt information.

Here, after the ACF calculated by the programmable logic unit is taken out of the memory by the memory control unit 701, the object detection unit 702 uses a classifier to assess the ACF, that is, to perform the target object detection to obtain the detection result, which may be the coordinates and the size of the target object.

For example, the target object detection is performed based on the scale features of the above 29 scales to determine whether there is a target in a certain scale. Taking the Adaboost classifier as an example, NT Random Decision Forests (RDF) weak classifiers (e.g., NT=3518) are used. Each RDF weak classifier is a random decision forest classifier. The detection results of the respective weak classifiers are summed up to form the detection score of an Adaboost strong classifier. Finally, the detection result is assessed based on the detection score of the strong classifier, and the final detection result is calculated based on the coordinates of the current feature. The sliding window detection is performed using the scale features of each scale. The window slides over 2 pixels each time on the feature plane, corresponding to 4 pixel points on the original image, and the set of detection results are output to the programmable logic unit i.e., the PL part of the heterogeneous processor, as described in the above embodiments.

As known from the above, the target object detection process of the processing unit, i.e., the PS part, in the heterogeneous processor is completed.

In addition, it should be noted that, in the one or more embodiments as described above, the heterogeneous memory and the memory belong to first-level units; the processing unit and the programmable logic unit belong to second-level units; and the memory control unit and the object detection unit belong to third-level units. Here, the second-level units are the units below the first-level units, and the third-level units are the units below the second-level units.

With the above technical solutions, the object detection device is provided in the embodiments of the present disclosure. The device includes: a heterogeneous processor and a memory; the heterogeneous processor includes: a processing unit and a programmable logic unit. First, the programmable logic unit receives the to-be-detected image; then performs ACF extraction on the to-be-detected image, and writes the extracted ACF into the memory. Next, the processing unit reads the ACF written by the programmable logic unit from the memory, performs target object detection according to the ACF, and then outputs the detection result to the programmable logic unit. Finally, the programmable logic unit receives the detection result from the processing unit, and then generates the prompt information according to the detection result, and outputs the prompt information, so as to implement the object detection. Thus, in the embodiments of the present disclosure, the feature extraction part with a larger amount of computation is executed in the programmable logic unit of the heterogeneous processor, which fully utilizes the parallel pipeline processing characteristics of the programmable logic unit, thus effectively improving the operation speed of the object detection algorithm.

Based on the same application concept, an embodiment of the present disclosure further provides an object detection method, which is applied to the object detection device according to the one or more embodiments as described above.

Figure 8:
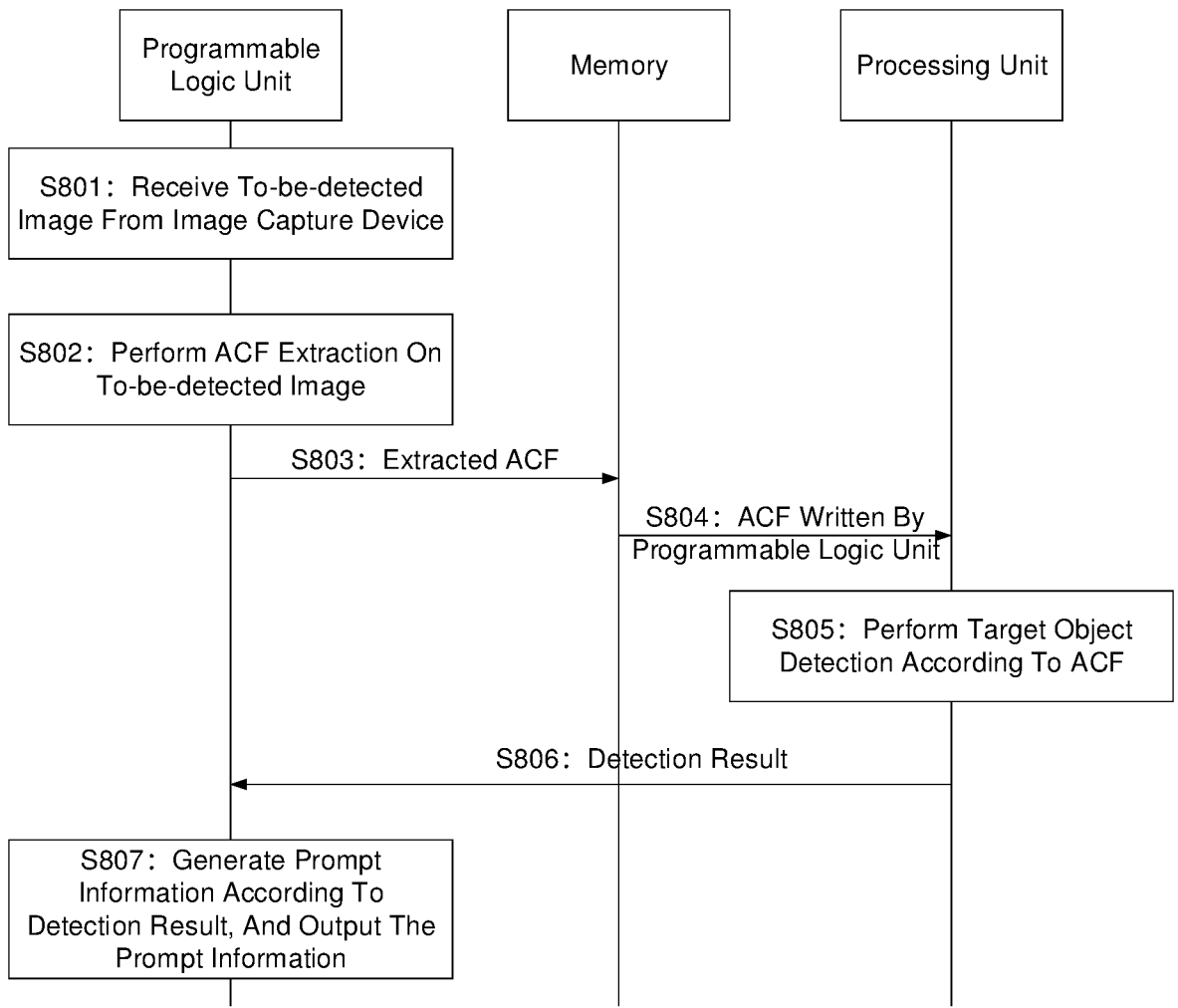
FIG. 8 is a schematic flowchart of an object detection method according to an embodiment of the present disclosure.

FIG. 8 is a schematic flowchart of an object detection method according to an embodiment of the present disclosure. Referring to FIG. 8, the method may include:

S801: receiving the to-be-detected image by the programmable logic unit;

S802: performing ACF extraction on the to-be-detected image by the programmable logic unit;

S803: writing the extracted ACF into the memory by the programmable logic unit;

S804: reading the ACF written by the programmable logic unit from the memory by the processing unit;

S805: performing target object detection according to the ACF by the processing unit;

S806: outputting the detection result to the programmable logic unit by the processing unit; and S807: generating the prompt information according to the detection result and outputting the prompt information by the processing unit.

In an embodiment of the present disclosure, S802 may include: receiving the to-be-detected image, and performing color format conversion on the to-be-detected image; and performing the ACF extraction on the converted to-be-detected image.

Further, the step of performing the ACF extraction on the converted to-be-detected image may include: performing color space conversion on the converted to-be-detected image to obtain color space information of the to-be-detected image; down-sampling the color space information to generate a down-sampled image in at least one scale; for each scale, calculating a corresponding scale feature for each pixel of the down-sampled image in the scale, and writing the scale feature corresponding to the down-sampled image in the scale into the memory as a scale feature of the scale; reading the scale feature of each scale from the memory; sequentially scaling the scale feature of each scale according to a preset scaling rule to obtain a preset number of scale features; and writing the preset number of scale features into the memory as the ACF.

Further, the step of calculating the corresponding scale feature for each pixel of the down-sampled image in the scale may include: calculating gradient values in horizontal and vertical directions for each pixel of the down-sampled image in the scale; calculating a gradient magnitude and a direction angle according to the gradient values in horizontal and vertical directions; scaling down the gradient magnitude in a preset proportion to generate a gradient magnitude feature; calculating a corresponding HOG according to the gradient magnitude and the direction angle; and determining the color space information, the gradient magnitude feature and the HOG corresponding to each pixel of the down-sampled image in the scale as scale features corresponding to the down-sampled image in the scale.

In an embodiment of the present disclosure, S807 may include: generating corresponding warning information according to the detection result, and outputting the warning information to an audio output device for prompting the user; or generating a corresponding prompt box according to coordinates and a size of a target object in the detection result, synthesizing the prompt box in the to-be-detected image, and outputting a synthesized image to a display device for prompting the user.

It should be noted here that the description of the above method embodiments is similar to the description of the above device embodiments, and has similar beneficial effects as the device embodiments. For technical details not disclosed in the method embodiments of the present disclosure, the description of the device embodiments in the present disclosure may be referred to for understanding.

Based on the same application concept, an embodiment of the present disclosure further provides an electronic device, which is used for object detection.

Figure 9:
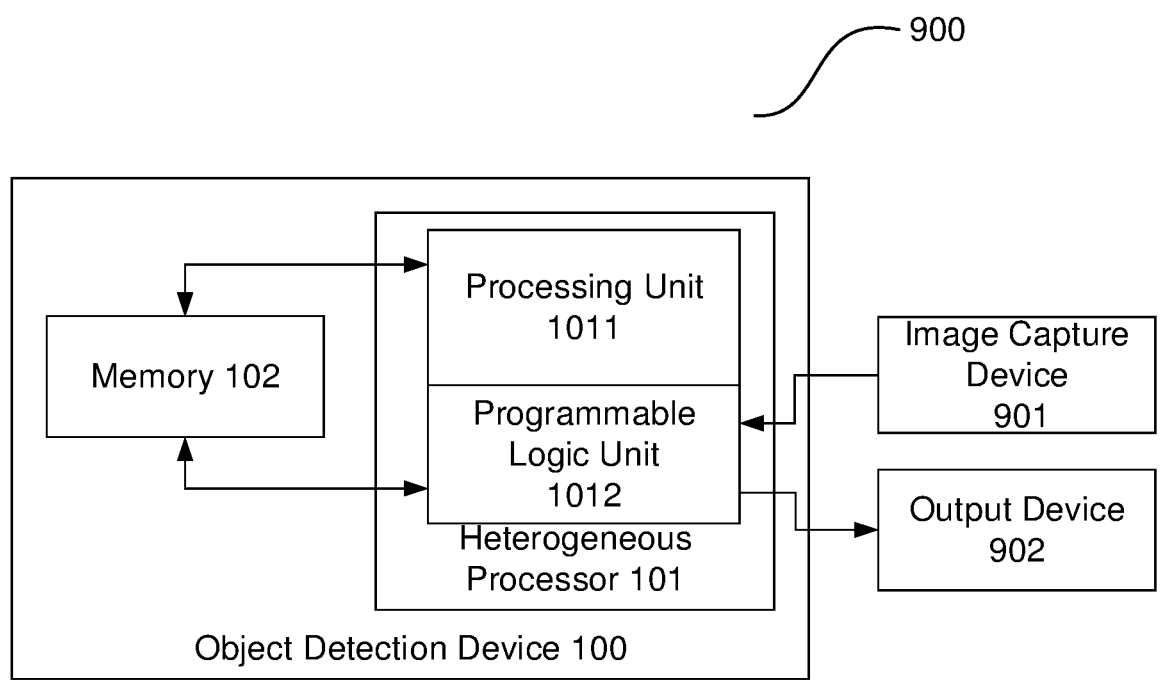
FIG. 9 is a schematic diagram of an electronic device according to an embodiment of the present disclosure.

FIG. 9 is a schematic diagram of an electronic device in an embodiment of the present invention. As shown in FIG. 1 and FIG. 9, the electronic device 900 may include: the object detection device 100 and the image capture device 901 as described in one or more embodiments previously. The image capture device 901 is configured to capture the to-be-detected image, and output the captured to-be-detected image to a programmable logic unit 1012 in the object detection device 100.

In an embodiment of the present disclosure, still referring to FIG. 9, the electronic device 900 may further include: an output device 902 for receiving the prompt information input by the programmable logic unit 1012 and outputting the prompt information.

In practical applications, the above-mentioned output device 902 may be an audio output device, such as a speaker, a headset, a car stereo, etc., for playing the audio information input by the programming logic unit 1012, or may be a display device, such as a car display screen, a security monitor, etc., for displaying the synthesized image input by the programming logic unit 1012. Of course, other output devices may be possible, which is not specifically limited in the embodiments of the present disclosure.

It should be noted here that the description of the above embodiment of the electronic device is similar to the description of the above-mentioned device embodiment, and has similar beneficial effects as the device embodiment. For technical details that are not disclosed in the embodiments of the electronic device in this application, please refer to the description of the device embodiments in this application for understanding.

It may be known from the above that, in the object detection device, the object detection method, and the electronic device provided in the embodiments of the present disclosure, the feature extraction part with a larger amount of computation is executed in the programmable logic unit of the heterogeneous processor, which fully utilizes the parallel pipeline processing characteristics of the programmable logic unit, thus effectively improving the operation speed of the object detection algorithm.

Those skilled in the art should understand that the embodiments of the present disclosure may be provided as a method, a system, or a computer program product. Therefore, the present disclosure may take the form of an entirely hardware embodiment, an entirely software embodiment, or an embodiment combining software and hardware aspects. Moreover, the present disclosure may take the form of a computer program product implemented on one or more computer-usable storage media (including but not limited to a disk storage, a CD-ROM, an optical storage, etc.) containing computer-usable program codes.

The present disclosure is described with reference to flowcharts and/or block diagrams of methods, devices (systems), and computer program products according to the embodiments of the present disclosure. It should be understood that each process and/or block in the flowcharts and/or block diagrams, and a combination of the processes and/or blocks in the flowcharts and/or block diagrams may be implemented by computer program instructions. These computer program instructions may be provided to a processor of a general-purpose computer, a special-purpose computer, an embedded processor, or other programmable data processing device to produce a machine, so that the instructions generated by the processor of the computer or other programmable data processing device may generate PLM plug-in for implementing the functions specified in one or more processes of the flowcharts and/or one or more blocks of the block diagrams.

These computer program instructions may also be stored in a computer-readable memory capable of directing the computer or other programmable data processing device to operate in a particular manner, such that the instructions stored in the computer-readable memory produce a manufactured article including an instruction PLM plug-in, which may implement the functions specified in one or more processes of the flowcharts and/or one or more blocks of the block diagrams.

These computer program instructions may also be loaded on the computer or other programmable data processing device, so that a series of operation steps are performed on the computer or other programmable device to produce a computer-implemented process. Thus, the instructions executed on the computer or other programmable device provide steps for implementing the functions specified in one or more processes of the flowcharts and/or one or more blocks of the block diagrams.

Although the preferred embodiments of the present disclosure have been described, those skilled in the art may make other changes and modifications to these embodiments once they know the basic inventive concepts. Therefore, the appended claims are intended to be construed to include the preferred embodiments and all changes and modifications that fall within the scope of the present disclosure.

Obviously, those skilled in the art may make various modifications and variations to the present disclosure without departing from the spirit and scope of the present disclosure. In this way, if these modifications and variations of the present disclosure fall within the scope of the claims of the present disclosure and their equivalent technologies, the present disclosure also intends to include these modifications and variations.

I claim:

1. An object detection device, comprising: a heterogeneous processor and a memory, the heterogeneous processor comprising: a processing unit and a programmable logic unit, wherein
the programmable logic unit is configured to receive a to-be-detected image, perform feature extraction on the to-be-detected image, and write an extracted feature into the memory;
the processing unit is configured to read the feature from the memory, perform target object detection according to the feature, and output a detection result to the programmable logic unit; and
the programmable logic unit is further configured to receive the detection result, generate prompt information according to the detection result, and output the prompt information,
wherein the programmable logic unit is further configured to:
perform color format conversion on the to-be-detected image, and
perform Aggregation Channel Features (ACF) extraction on the converted to-be-detected image, and write an extracted ACF into the memory,
wherein the programmable logic unit is further configured to:
perform color space conversion on the converted to-be-detected image to obtain color space information of the to-be-detected image,
down-sample the color space information to generate a down-sampled image in at least one scale,
calculate a corresponding scale feature for each pixel of the down-sampled image in a corresponding scale, and determine the scale feature corresponding to the down-sampled image in the scale as a scale feature of the scale,
write, into the memory, the scale feature corresponding to the down-sampled image in the scale, and
read the scale feature of each scale from the memory, sequentially scale the scale feature of each scale according to a preset scaling rule to obtain a preset number of scale features, and writing the preset number of scale features into the memory as the ACF.

2. The object detection device according to claim 1, wherein the processing unit is a processing unit of a Central Processing Unit (CPU) architecture.

3. The object detection device according to claim 1, wherein the programmable logic unit is one of a Field Programmable Gate Array (FPGA) and a Complex Programmable Logic Device (CPLD).

4. The object detection device according to claim 1, wherein the feature extraction comprises any one of: Histogram of Oriented Gradient (HOG); Scale-Invariant Feature Transform (SIFT); Speeded Up Robust Features (SURF); Difference of Gaussian (DOG); Local Binary Pattern (LBP); or haar-like feature extraction algorithm.

5. The object detection device according to claim 1, wherein the programmable logic unit is further configured to calculate gradient values in horizontal and vertical directions for each pixel of the down-sampled image in the scale; calculate a gradient magnitude and a direction angle according to the gradient values in horizontal and vertical directions; scale down the gradient magnitude in a preset proportion to generate a gradient magnitude feature; calculate a corresponding Histogram of Oriented Gradient (HOG) according to the gradient magnitude and the direction angle; and determine the color space information, the gradient magnitude feature and the HOG corresponding to each pixel of the down-sampled image in the scale as scale features corresponding to the down-sampled image in the scale.

6. The object detection device according to claim 5, wherein the programmable logic unit scales down the gradient magnitude in the preset proportion to generate the gradient magnitude feature by operations of: dividing the gradient magnitude corresponding to the down-sampled image in the scale into 2×2 sub-blocks, then calculating an average value of the gradient magnitudes of each sub-block, and then taking the calculated average value of the gradient magnitudes as a gradient magnitude feature of the down-sampled image so as to obtain a gradient magnitude for which row and column resolutions are scaled down by half respectively compared to the down-sampled image in the scale, as the gradient magnitude feature of the scale.

7. The object detection device according to claim 1, wherein the programmable logic unit is further configured to receive the detection result from the processing unit, generate corresponding prompt information according to the detection result, and output the prompt information.

8. The object detection device according to claim 7, wherein the programmable logic unit generates the corresponding prompt information according to the detection result and outputs the prompt information by operations of: generating corresponding warning information according to the detection result, and outputting the warning information to an audio output device.

9. The object detection device according to claim 7, wherein the programmable logic unit generates the corresponding prompt information according to the detection result and outputs the prompt information by operations of: generating a corresponding prompt box according to coordinates and a size of a target object in the detection result, synthesizing the prompt box in the to-be-detected image, and outputting a synthesized image to a display device.

10. An object detection method applied to the object detection device according to claim 1, comprising:
receiving, by the programmable logic unit, the to-be-detected image;
performing, by the programmable logic unit, the feature extraction on the to-be-detected image, and writing the extracted feature into the memory, wherein the feature is used to instruct the processing unit to perform the target object detection and output the detection result to the programmable logic unit; and receiving, by the programmable logic unit, the detection result from the processing unit, generating the prompt information according to the detection result, and outputting the prompt information.

11. The object detection method according to claim 10, wherein said performing by the programmable logic unit the feature extraction on the to-be-detected image comprises:
receiving the to-be-detected image, and performing color format conversion on the to-be-detected image; and
performing Aggregation Channel Features (ACF) extraction on the converted to-be-detected image.

12. The object detection method according to claim 11, wherein said performing the ACF extraction on the converted to-be-detected image comprises:
performing color space conversion on the converted to-be-detected image to obtain color space information of the to-be-detected image; down-sampling the color space information to generate a down-sampled image in at least one scale; for each scale, calculating a corresponding scale feature for each pixel of the down-sampled image in the scale and writing the scale feature corresponding to the down-sampled image in the scale into the memory as a scale feature of the scale; and
reading the scale feature of each scale from the memory; sequentially scaling the scale feature of each scale according to a preset scaling rule to obtain a preset number of scale features; and writing the preset number of scale features into the memory as the ACF.

13. The object detection method according to claim 12, wherein said calculating the corresponding scale feature for each pixel of the down-sampled image in the scale comprises:
calculating gradient values in horizontal and vertical directions for each pixel of the down-sampled image in the scale;
calculating a gradient magnitude and a direction angle according to the gradient values in horizontal and vertical directions;
scaling down the gradient magnitude in a preset proportion to generate a gradient magnitude feature;
calculating a corresponding Histogram of Oriented Gradient (HOG) according to the gradient magnitude and the direction angle; and
determining the color space information, the gradient magnitude feature and the HOG corresponding to each pixel of the down-sampled image in the scale as scale features corresponding to the down-sampled image in the scale.

14. The object detection method according to claim 10, wherein said generating the prompt information according to the detection result and outputting the prompt information comprises:
generating corresponding warning information according to the detection result, and outputting the warning information to an audio output device; or
generating a corresponding prompt box according to coordinates and a size of a target object in the detection result, synthesizing the prompt box in the to-be-detected image, and outputting a synthesized image to a display device.

15. An object detection method applied to the object detection device according to claim 1, comprising:
reading the feature by the processing unit from the memory, the feature being extracted by the programmable logic unit from the to-be-detected image;
performing the target object detection by the processing unit according to the feature, and outputting the detection result to the programmable logic unit, the detection result being used to instruct the programmable logic unit to generate and output the prompt information.

16. An electronic device comprising: the object detection device according to claim 1 and an image capture device, wherein
the image capture device is configured to capture the to-be-detected image, and output the captured to-be-detected image to the programmable logic unit.

17. The electronic device according to claim 16, wherein the electronic device further comprises: an output device for receiving the prompt information input by the programmable logic unit and outputting the prompt information.

* * * * *